United States Patent
Wang et al.

(10) Patent No.: US 9,342,232 B2
(45) Date of Patent: *May 17, 2016

(54) INFORMATION-PROCESSING APPARATUS PROVIDING MULTIPLE DISPLAY MODES

(75) Inventors: Jian Wang, Tokyo (JP); Takashi Sato, Tokyo (JP); Hiroki Tamai, Kanagawa (JP); Takanori Nishimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 855 days.

This patent is subject to a terminal disclaimer.

(21) Appl. No.: 12/942,368

(22) Filed: Nov. 9, 2010

(65) Prior Publication Data

US 2011/0050616 A1    Mar. 3, 2011

Related U.S. Application Data

(63) Continuation of application No. 11/224,970, filed on Sep. 14, 2005, now Pat. No. 9,052,813.

(30) Foreign Application Priority Data

Oct. 5, 2004  (JP) ................................. 2004-292409

(51) Int. Cl.
    *G06F 3/0485*    (2013.01)
    *G06F 3/0488*    (2013.01)
    *G06F 3/0486*    (2013.01)

(52) U.S. Cl.
    CPC ............ *G06F 3/0488* (2013.01); *G06F 3/0486* (2013.01)

(58) Field of Classification Search
    CPC ..................................................... G06F 3/0485
    USPC .................................. 345/87–104, 173–178
    See application file for complete search history.

(56) References Cited

U.S. PATENT DOCUMENTS

| | | |
|---|---|---|
| 5,818,425 A | 10/1998 | Want et al. |
| 5,956,020 A | 9/1999 | D'Amico et al. |

(Continued)

FOREIGN PATENT DOCUMENTS

| | | |
|---|---|---|
| JP | 08-317324 | 11/1996 |
| JP | 9-128135 | 5/1997 |

(Continued)

OTHER PUBLICATIONS

Office Action issued Nov. 18, 2010, in Japanese Patent Application No. 2004-292409.

(Continued)

*Primary Examiner* — Sanghyuk Park
(74) *Attorney, Agent, or Firm* — Oblon, McClelland, Maier & Neustadt, L.L.P.

(57) ABSTRACT

An information-processing apparatus according to an embodiment of the present invention allows the user to select one of a plurality of input operation modes of the absolute coordinate input unit. One of the input operation modes is a specific mode allowing a display range to be moved to a desired position in a state where the highest resolution of a display unit integrated with the absolute coordinate input unit is lower than the resolution of an entire screen. The information-processing apparatus has a configuration in which, when an operation face of the absolute coordinate input unit is touched to carry out a drag operation in this specific mode, the distance of a movement made in the drag operation is detected, and the position of the display range is then changed by moving the display range by the detected distance.

18 Claims, 8 Drawing Sheets

(56) References Cited

U.S. PATENT DOCUMENTS

| | | |
|---|---|---|
| 6,057,840 A | 5/2000 | Durrani et al. |
| 6,097,387 A | 8/2000 | Sciammarella et al. |
| 6,380,929 B1 | 4/2002 | Platt |
| 2002/0036702 A1 | 3/2002 | Ohnogi |
| 2002/0078084 A1 | 6/2002 | Konttinen |
| 2003/0074587 A1 | 4/2003 | Casebolt et al. |
| 2003/0135649 A1 | 7/2003 | Buckley et al. |
| 2003/0164861 A1 | 9/2003 | Barbanson et al. |
| 2003/0174169 A1 | 9/2003 | Tiwari et al. |
| 2003/0210285 A1 | 11/2003 | Numano |
| 2004/0008210 A1 | 1/2004 | Ikehata |
| 2004/0027395 A1 | 2/2004 | Lection et al. |
| 2004/0027397 A1* | 2/2004 | Sato .................. 345/863 |
| 2004/0150630 A1 | 8/2004 | Hinckley et al. |
| 2004/0174398 A1 | 9/2004 | Luke et al. |
| 2004/0221322 A1 | 11/2004 | Shen et al. |
| 2005/0168441 A1 | 8/2005 | Obitsu et al. |
| 2006/0048073 A1 | 3/2006 | Jarrett et al. |

FOREIGN PATENT DOCUMENTS

| | | |
|---|---|---|
| JP | 10-149254 | 6/1998 |
| JP | 11-004961 | 1/1999 |
| JP | 2000-59553 | 2/2000 |
| JP | 2001-296948 | 10/2001 |
| JP | 2003-131811 | 5/2003 |
| JP | 2003-196671 | 7/2003 |
| JP | 2006-107092 | 4/2006 |
| WO | WO 02/08881 A2 | 1/2002 |

OTHER PUBLICATIONS

Office Action issued Sep. 2, 2010, in Japan Patent Application No. 2008-263770.

Extended European Search Report issued Apr. 28, 2011, in Patent Application No. 05021744.7.

\* cited by examiner

FIG.8
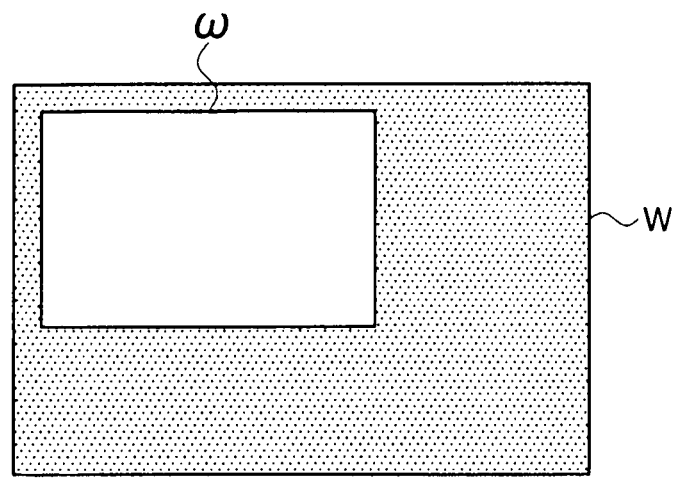
 SCREEN
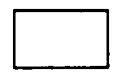 DISPLAY AREA

INFORMATION-PROCESSING APPARATUS PROVIDING MULTIPLE DISPLAY MODES

CROSS REFERENCES TO RELATED APPLICATIONS

This application is a continuation of U.S. application Ser. No. 11/224,970, filed Sep. 14, 2005, and is based upon and claims the benefit of priority from prior Japanese Patent Application No. 2004-292409, filed Oct. 5, 2004, the entire contents of each of which are incorporated herein by reference.

BACKGROUND OF THE INVENTION

The present invention relates to a technology used for improving operatability to specify a display range in an information-processing apparatus having a configuration allowing the user to enter operation inputs while viewing a screen display by using a coordinate input unit (or a coordinate read unit) such as a touch panel.

As an operation input configuration of an information-processing apparatus such as a portable computer, there is known a configuration using an input unit (or a read unit) of an absolute coordinate type. Examples of the input unit (or the read unit) of the absolute coordinate type are a touch panel and a tablet. With the input unit (or the read unit) of the absolute coordinate type, an operation input can be entered to the information-processing apparatus by using a stylus or a finger. With an application program activated to run under an operating system (hereinafter referred to as OS) executed in the information-processing apparatus, for example, the user is capable of carrying out an operation by using a GUI (Graphical User Interface) while viewing information appearing on the display screen of the apparatus.

There has been known an input pen system having a switching function allowing the user familiar with operations carried out in a GUI environment using a pointing device such as the mouse to enter an operation input in the same operating sense as an apparatus provided with a touch panel as disclosed in some documents. An example of the switching function is a function to switch from a right-click facility of the mouse to left-click facility thereof and vice versa.

One of such techniques is disclosed, for example, in Japanese Patent Laid-open No. 2000-81951.

SUMMARY OF THE INVENTION

With the conventional information-processing apparatus, however, the operatability of specifying a display range raises a problem caused by the fact that a touch panel is employed as a pointing device of the absolute coordinate type.

FIG. 8 is an explanatory diagram showing a state in which the highest resolution of an absolute coordinate input unit is lower than the resolution of a display screen to be displayed.

A rectangular frame W in the figure is the display screen whereas a rectangular frame ω having a small area in the display screen W is a display range (or a display area) of the display unit such as a tablet integrated display unit.

If the resolution of the display screen exceeds an assumed resolution of the display of a CRT (Cathode Ray Tube) display unit or an LCD (liquid-crystal display unit, a panning state will be resulted in. A panning state is a display state in which only a range corresponding to the display area ω is partially displayed on the display screen W. That is to say, a panning state is a display state caused by the fact that the highest resolution of the display unit is lower than the resolution of a display screen. However, deletion of picture data or the like is not taken into consideration. By the way, the assumed resolution cited above is also referred to as a displayable highest resolution.

In such a panning state, the user is not capable of specifying a position outside the display range ω by operating the touch panel. That is to say, the use of another relative coordinate device for moving a pointer from the display range to another display range in the display screen is indispensable since the function of such a relative coordinate device cannot be implemented by merely operating the touch panel. For example, it is necessary to use a device such as a track point, an operation stick or a mouse to move the pointer to an outside position beyond the boundary of the display range in a desired direction, that is, to move the pointer to an intended display range.

An input operation mode in the panning state is referred to hereafter as a panning mode. In the panning mode, by operating only the absolute coordinate input unit, a desired display range cannot probably be specified, or another device is required, affecting the operatability seen from the user point of view. As an alternative, there may be raised a problem bringing about an increase in component count and/or an increase in cost, which are mainly caused by complexity of a circuit configuration and/or control.

It is desirable to provide devices for improving user operatability for specifying a display range in an information-processing apparatus employing an absolute coordinate input unit such as a touch panel.

According to an embodiment of the present invention, there is provided an information-processing apparatus having a configuration in which, when an operation face of an absolute coordinate input unit employed in the information-processing apparatus is touched in a touch operation carried out in a panning mode to move a display operator over a display screen appearing on a display unit employed in the information-processing apparatus, the distance of a movement of the display operator is detected, and the position of a display range on the display screen is then changed by moving the display range by the detected distance where the panning mode is a display-range operation mode allowing the position of a display range to be changed by moving the display range in a state of displaying only a portion of the entire display screen on the display unit.

In addition, a program executed by the information-processing apparatus according to an embodiment of the present invention includes the steps of: determining that an input operation mode has been changed to a display-range operation mode; and changing a display range by moving the display range on a display screen appearing on a display unit employed in the information-processing apparatus by a distance detected as the distance of a movement of a display operator, which is moved over the display screen when an operation face of an absolute coordinate input unit employed in the information-processing apparatus is touched in a touch operation after the input operation mode has been changed to the display-range operation mode.

Thus, according to an embodiment of the present invention, in the panning mode where only a portion of the screen appears on the display unit, a display range can be moved to a desired location by merely operating the absolute coordinate input unit.

According to an embodiment of the present invention, another relative coordinate input device is not required in a panning state. Thus, the present invention effectively allows the configuration of the information-processing apparatus to be simplified and the manufacturing cost thereof to be reduced. In addition, the present invention is also effective for improving operatability and convenience, which are provided for the user.

In addition, in the configuration allowing the input operation mode to be changed by carrying out a touch operation on a specific operation area provided on the absolute coordinate input unit, hardware operation keys are not needed. Thus, the present invention is suitable for increasing the size of a display unit. Moreover, by further designing the configuration so as to allow the input operation mode to be changed in a cyclic manner by carrying out a touch operation on the specific operation area, the size of the operation area can be reduced to a required minimum.

The capability of changing and/or switching to a hover mode can implemented with ease is effective for improvement of operatability. The hover mode is a mode corresponding to an operation to move a mouse pointer.

BRIEF DESCRIPTION OF THE DRAWINGS

These and other objects of the invention will be seen with reference to the description, taken in connection with the accompanying drawings, in which:

FIG. 8 is an explanatory diagram showing a panning state.

DETAILED DESCRIPTION OF THE PREFERRED EMBODIMENTS

The present invention provides an information-processing apparatus having an absolute coordinate input unit and a display unit, with which the absolute coordinate input unit is integrated. The information-processing apparatus has a configuration allowing a display range to be modified in a panning state by operating only the absolute coordinate input unit. It is to be noted that the information-processing apparatus according to an embodiment of the present invention can also be applied to equipment such as a computer, a PDA (Personal Digital Assistant), a variety of video apparatus and an acoustic apparatus.

Figure 1:
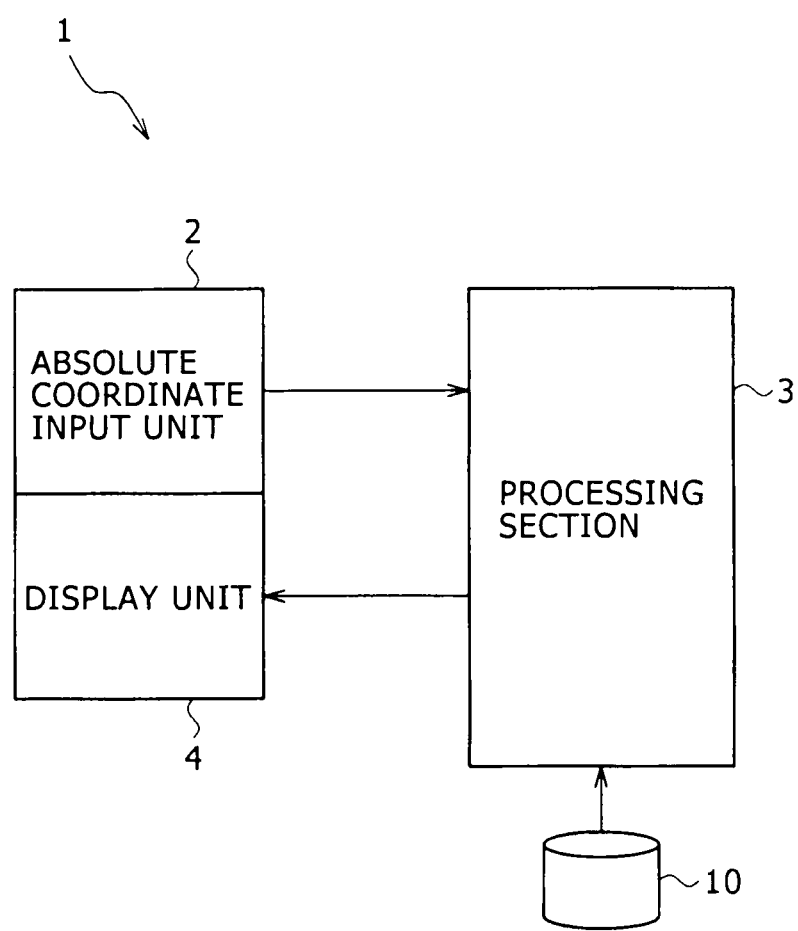
FIG. 1 is a block diagram showing a typical basic configuration of an embodiment of the present invention.

FIG. 1 is a diagram showing a typical basic configuration of an information-processing apparatus 1 according to the embodiment of the present invention.

As an absolute coordinate input unit 2, the information-processing apparatus 1 employs a touch panel integrated with a display unit 4 to be described later, and a pen input device or a digitizer or the like. When the user specifies a position on an operation face by using a finger, a pen or a stylus, for example, absolute coordinates of the specified position are detected. It is to be noted that the present invention can be applied to the information-processing apparatus 1 without regard to whether the connection between the pointing device such as an input pen and a main body 5 of the information-processing apparatus 1 is a wire connection or a wireless (or radio) connection.

A processing unit 3, which is typically a CPU (Central Processing Unit) or a system controller processes information on a position or an operation specified in an operation carried out by the user by using the absolute coordinate input unit 2.

As described above, the display unit 4 is integrated with the absolute coordinate input unit 2. As the display unit 4, a device such as a liquid-crystal display panel is employed. The user is capable of carrying out an input operation or a select operation on the absolute coordinate input unit 2 while viewing a display on the screen of the display unit 4.

It is to be noted that the present invention can be applied to a configuration having an operation section including hardware keys such as operation buttons and switches on the main body of the information-processing apparatus 1 or a configuration allowing an input to be entered or a selection to be specified completely by carrying out an operation on the absolute coordinate input unit 2 without providing such an operation section.

Figure 2:
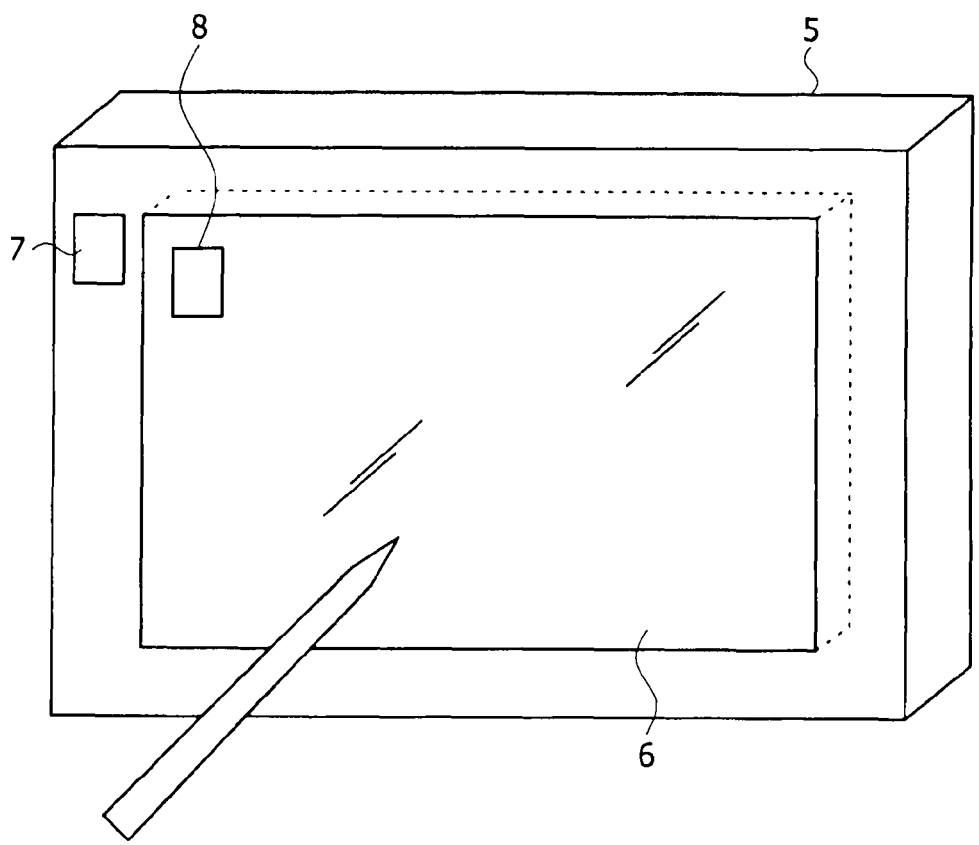
FIG. 2 is a diagram showing an information-processing apparatus in a simple manner.

FIG. 2 is a diagram showing the information-processing apparatus 1 in a simple manner. The front face of the main body 5 is provided with an operation display section 6 integrated with a touch panel and a display device.

When an operation is carried out on the touch panel by using a device such as a finger or a stylus, an input operation mode can be changed by a specific operation key 7 provided on the main body 5 or a specific operation area 8 provided on the touch panel.

Operations carried out by the user on the touch panel include the following operations.

Touch is an operation to touch the touch panel by using a pointing device such as a finger or a stylus and keep the pointing device on the touch panel as it is.

Release is an operation to release the pointing device such as a finger or a stylus from the touch panel from a state in which the pointing device is in contact with the touch panel.

Single tap (or the so-called tap) is an operation to touch the touch panel by using the pointing device such as a finger or a stylus and then release the pointing device from the touch panel right away.

Double tap is an operation to carry out a single tap twice consecutively in a row.

Drag is an operation to move the pointing device such as a finger or a stylus over the touch panel by keeping the pointing device in a state of touching the touch panel or a state in which the pointing device is being kept in contact with the touch panel.

In a normal input operation mode, a release operation to release the pointing device from the touch panel after the pointing device is brought into contact with the touch panel corresponds to a click carried out on a main button in a mouse operation. The main button is the ordinary left button and the click carried out on ordinary left button in a mouse operation is referred to as the so-called left click.

In a mouse operation, besides a click on the main button, there are the so-called right click and a hover operation. The right click is a click on an auxiliary button, which is the ordinary right button. The hover operation is a move operation to move only the mouse pointer. The user needs to properly select one of the operations described above in accordance with a condition faced by the user.

A method for selecting one of input operation modes assumed below is explained as follows.

Left-Click Mode (Main-Button Click Mode)

The left-click mode is a mode set in an initial state. When the user carries out a tap operation on the touch panel in the left-click mode, the tap operation is recognized as a mouse event of the left click and reported to the OS.

Right-Click Mode (Auxiliary-Button Click Mode)

When the user carries out a tap operation on the touch panel in the right-click mode, the tap operation is recognized as a mouse event of the right click and reported to the OS.

Hover Mode (Pointer-Only Movement Mode)

When the user carries out a tap operation on the touch panel in the hover mode, the tap operation is recognized as a mouse event of the right click and reported to the OS.

Panning Mode

The panning mode is a mode that can be set only in a panning state. That is to say, the panning mode is a display-range operation mode for a state in which the highest resolution of the display unit 4 is lower than the resolution of a screen to be displayed. Concrete operations executable in the panning mode will be described later.

If the present mode is the left-click mode, the present mode can be changed to the right-click mode or the hover mode. As a method to change the present mode to the right-click mode or the hover mode, a dedicated application program is activated and then the present mode is changed to another mode. As an alternative, a plurality of operations needs to be carried out in order to change a mode to another. In this case, however, long time and much labor are required. In addition, the user needs to master a procedure for carrying out the operations.

In order to solve the problems described above, it is desirable to provide a configuration allowing the user to operate the operation key 7 on the main body 5 or touch the specific operation area 8 provided on the absolute coordinate input unit 2 in order to change a mode to another.

Figure 3:
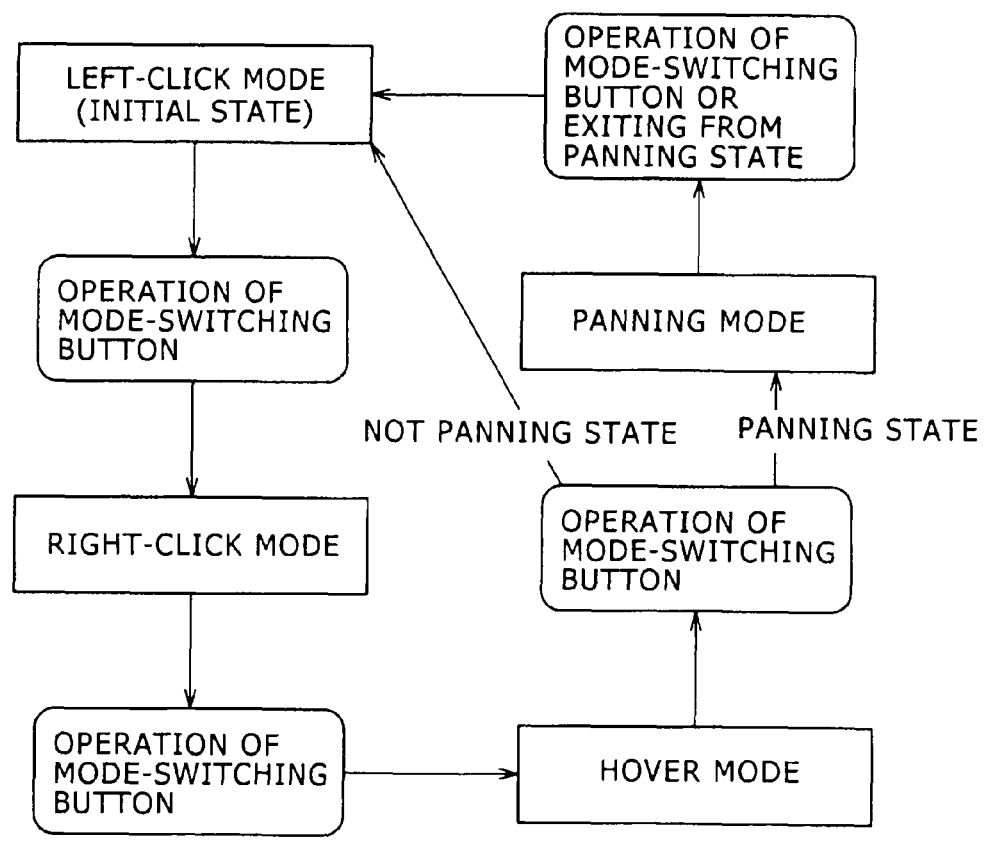
FIG. 3 is an explanatory diagram showing typical state transitions between input operation modes.

FIG. 3 is an explanatory diagram showing typical state transitions initiated by operating a specific operation button as transitions between the input operation modes described above. The specific operation button used for initiating the mode transitions is referred to hereafter as a mode-switching button.

First of all, in the initial state, the left-click mode is selected. Then, the left-click mode is changed to the right-click mode by operating the mode-switching button. To put it concretely, the mode-switching button can be operated by pressing the button or by tapping an operation area. When the switching-button is further carried out, the right-click mode is changed to the hover mode. When the switching-button is further carried out, the hover mode is changed back to the left-click mode if the information-processing apparatus 1 is not in the panning state or the hover mode is changed to the panning mode if the information-processing apparatus 1 is in the panning state.

The panning mode is changed to the left-click mode if the mode-switching button is operated or if the information-processing apparatus 1 exits from the panning state.

In a configuration, where the input operation mode can be changed in a cyclic manner by operating the mode-switching button as described above, only a single operation button or a single operation area is needed. Thus, the occupied area can be suppressed to a minimum. That is to say, it is not necessary to provide an operation key 7 on the main body 5 for each mode transition or provide an operation touch section in the operation area 8 for each input operation mode. In the example described above, for example, four input operation modes are provided and the number of input operation modes may actually be even larger. If it is necessary to provide an operation key 7 on the main body 5 for each mode transition or provide an operation touch section in the operation area 8 for each input operation mode, the number of operation keys 7 and/or the number of occupied areas on the information-processing apparatus will also increase as well. Thus, the display area will be affected.

It is to be noted that, in a configuration where the input operation mode can be changed by carrying a touch operation on a specific operation area provided on the touch panel, no dedicated hardware keys are needed. Thus, the display area of the display unit can be increased by an amount corresponding to the elimination of the dedicated hardware keys.

Now, the panning mode is explained below.

If a CRT or a liquid-crystal display device is used as the display unit 4, an image can be displayed at one of a plurality of different resolutions. If the screen resolution is lower than the highest resolution displayable by the display unit 4, the whole screen can typically be displayed on the display unit 4.

If the screen resolution is higher than the highest resolution displayable by the display unit 4, however, only a portion of the screen can be displayed by using an image-processing function of a graphic LSI or the like in the so-called panning state as explained above with reference to FIG. 8.

In the panning state, the input operation mode can be changed to the panning mode by operating the mode-switching button. Then, an operation carried out by the user on the touch panel is recognized, for example, as a command to move a display range.

FIGS. 4A to 4D are explanatory diagrams showing operation states in the panning mode. Notations W and ω denote the same things as those explained above with reference to FIG. 8. In this example, the display frames each have a rectangular shape. It is to be noted that the present invention is not to be limited to the rectangular shape. That is to say, any frame shapes may be used.

Figure 4A:
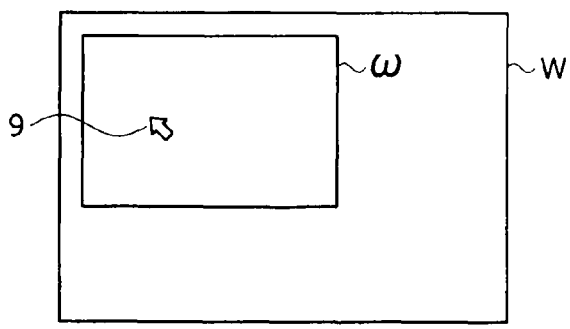
FIGS. 4A to 4D are explanatory diagrams showing operation states in a panning mode.

In the first place, FIG. 4A is a diagram showing a screen frame W displayed on the display unit 4 with a frame ω appearing on a portion inside the screen frame W and a pointer (or a cursor) displayed on the frame ω as a display operator 9 having an arrow-like shape.

Figure 4B:
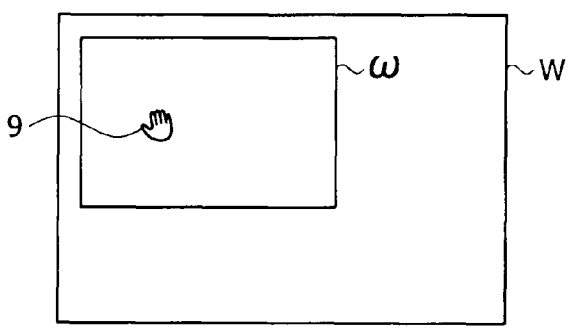

In this state, when the input operation mode is changed to the panning mode, the shape of the display operator 9 is changed to a shape provided for the panning mode as shown in FIG. 4B. In this example, the shape provided for the panning mode is the shape of the palm of a left hand.

Figure 4C:
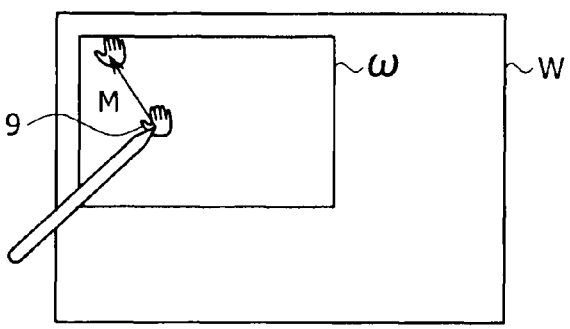
Figure 4D:
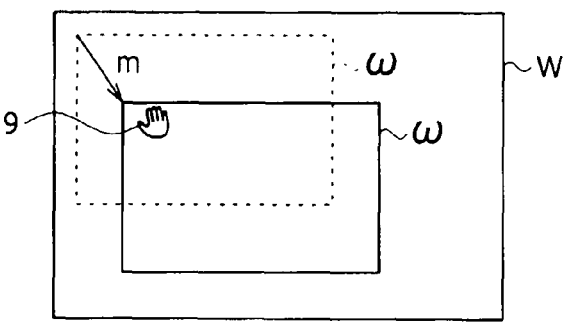

Then, as shown in FIG. 4C, the user carries out an operation to slide a pointing device such as a stylus or a finger over the touch panel with the pointing device kept in a state of being brought into contact with the touch panel, that is, with the pointing device kept in a state of touching the touch panel, as it is. The operation to slide a pointing device such as a stylus or a finger over the touch panel with the pointing device kept in a state of being brought into contact with the touch panel is referred to as a drag operation. As a result, the display range shown so far as a dashed-line frame is moved to the location of another display range shown as a solid-line frame as shown in FIG. 4D. For example, when a drag operation is carried out to move the display operator 9 in a slanting left-upward direction indicated by an arrow M shown in FIG. 4C, the movement distance of the operation is detected. Then, the display range shown as the frame ω is moved in a slanting right-downward direction indicated by an arrow m shown in FIG. 4D by the detected movement distance. In this case, the display range is shifted with the size of the frame ω remaining the same. As a result, the image of a display range different from the display range displayed so far appears on the display unit 4.

As described above, if an operation of touching the operation face of the absolute coordinate input unit 2 by using a pointing device is carried out to move the display operator 9 over the display screen after the input operation mode has been changed to the panning mode, the movement quantity of the operation is detected and processing is performed to move or change the display range in accordance with the detected movement quantity.

A program including a step of implementing this processing is read out from a storage section 10 employed in the information-processing apparatus 1 as shown in FIG. 1 and interpreted by the CPU for execution. That is to say, the core of the processing carried out by the information-processing apparatus 1 is implemented by hardware including the processing unit 3 such as the CPU and a collection of various programs executed by the processing unit 3. By execution of the programs according to information on operations, the following processing steps are carried out.

(1) A processing step of confirming that the input operation mode has been changed to the panning mode.
(2) A processing step of detecting the movement distance of a specific operation and performing processing to change the display range on the display screen of the display unit 4 by moving the display range by the detected movement distance when the specific operation is carried out to move the display operator 9 over the display screen by execution of an operation of touching the operation face of the absolute coordinate input unit 2 after the input operation mode has been changed to the panning mode.

By applying the information-processing apparatus 1 explained above and the programs described above or a storage medium used for storing the programs, the position of a display range in the panning state can be changed by using only the touch panel. In addition, by providing members such as an operation button to change the input operation mode of the touch panel, the mode can be changed from one to another with ease. It is also desirable to assign the function to change the input operation mode to a single operation section so as to achieve simplification of the operation system.

Embodiment

An embodiment applying the present invention to a portable computer is explained as follows.

Figure 5:
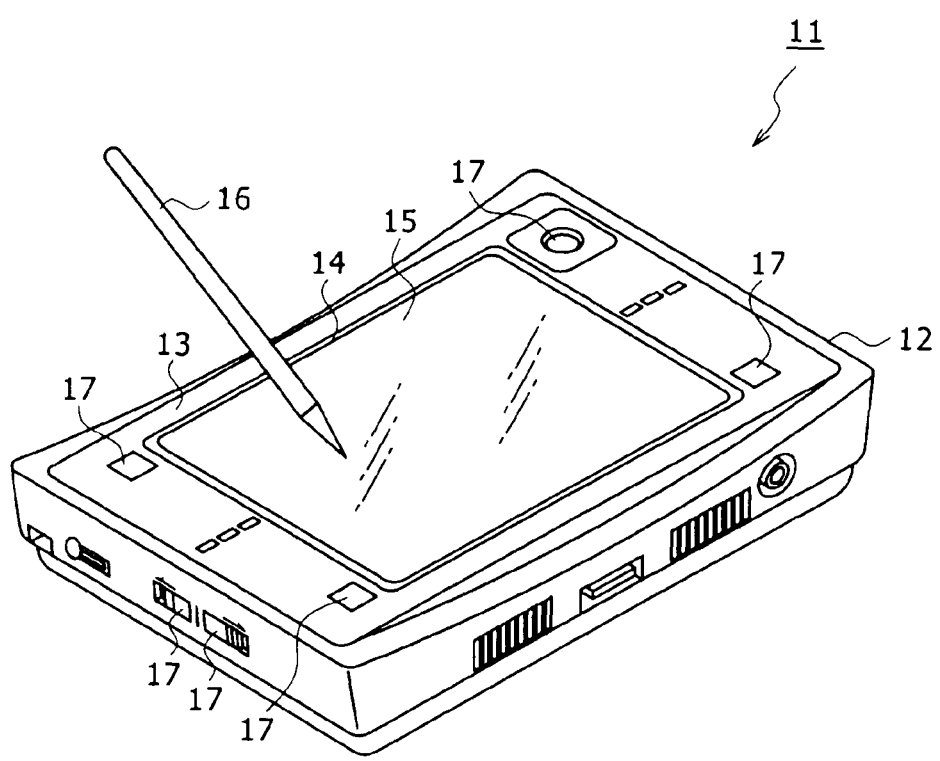
FIG. 5 is a diagram showing a perspective view of an external typical configuration of the information-processing apparatus as a view to be used in explanation of an embodiment of the present invention in conjunction with FIGS. 6 and 7.

As shown in FIG. 5, a case 12 of an information-processing apparatus 11 has a transversally long flat rectangular shape. On a front face 13 of the case 12, a display device 14 such as a liquid-crystal display device is provided.

A touch panel is provided on the surface 15 of the display device 14. The user is capable of carrying out a select operation and an input operation by specifying a desired position on an operation face through use of a pointing device 16 such as a finger, a dedicated pen or a stylus while viewing the display screen. It is to be noted that, at predetermined locations on the case 12, a variety of operations elements 17, 17 and so on is provided. Examples of the operation elements 17, 17 and so on are buttons and switches. One of the operation elements 17, 17 and so on is a mode-switching button. A typical configuration of the operation elements 17, 17 and so on is explained as follows.

Assignment of key functions to the operation elements 17, 17 and so on is fixed.
Assignment of key functions to the operation elements 17, 17 and so on can be changed for the sake of handedness and/or convenience for the user.

Figure 6:
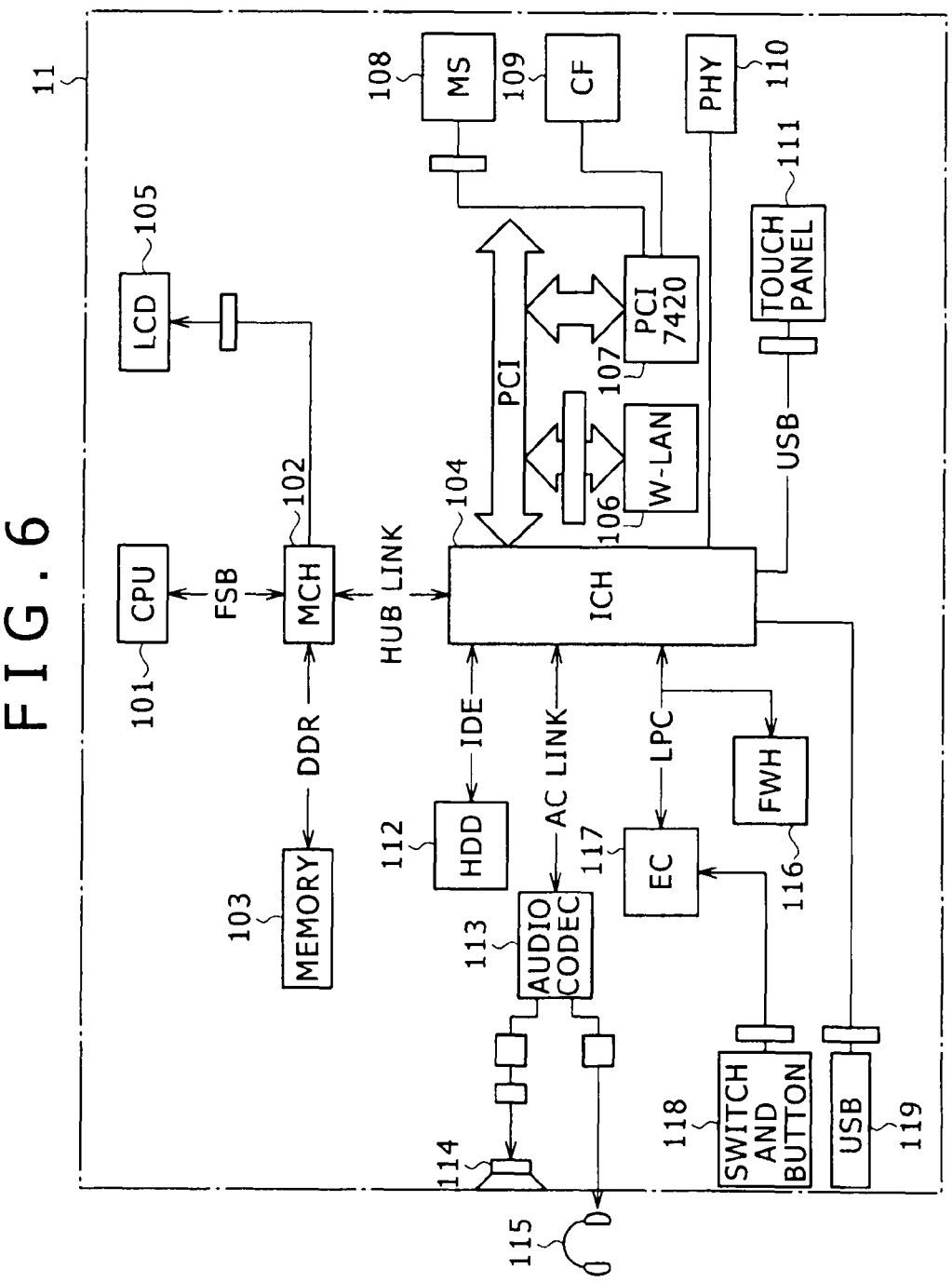
FIG. 6 is a block diagram showing a typical hardware configuration of the information-processing apparatus.

FIG. 6 is a block diagram showing a typical hardware configuration of the information-processing apparatus 11.

As shown in the figure, a CPU 101 serving as a control nucleus is connected to a control unit 102 through an FSB (Front Side Bus). The control unit 102, other control units and other devices form the processing unit 3 described above. The other control units and other devices will be described later. The control unit 102 is a component for executing control of a main memory 103 and a graphic function. The control unit 102 mainly plays a role for processing data having a large amount at a high speed. In AT compatibility, the control unit 102 is referred to as a north bridge. In this embodiment, the control unit 102 is connected to the CPU 101, the main memory 103, a control unit 104 and a graphic display unit 105 such as a liquid-crystal display device.

The control unit 104 is a component mainly for controlling elements such as control devices provided for a user interface and for controlling bus links of devices. In the AT compatibility, the control unit 104 is referred to as a south bridge. In an ISA bridge to the PCI, the control unit 104 plays a role of a bridge between a PCI (Peripheral Component Interconnect) bus and a low-speed bus such as an ISA (Industry Standard Architecture) bus. The control unit 104 has the functions of controllers such as an ISA controller and an IDE (Integrated Drive Electronics) controller.

The PCI bus is connected to a radio LAN (or a W-LAN) serving as a radio communication device 106 and a device 107 for connection with and controlling an external memory and an external apparatus. As the external memory, a semiconductor memory device can be employed. The device 107 is provided with a control device 108 for reading out and writing data from and into a stick-shaped storage medium and a control device 109 for reading out and writing data from and into a card-shaped storage medium. In addition, the device 107 has the function of a connection interface with an external apparatus. An example of the connection interface is an interface conforming to IEEE 1394 defining specifications of hardware for adding a serial device to a computer.

The control unit 104 is connected a LAN (Local Area Network) connection device 110 and a USB (Universal Serial Bus) port connected to the touch panel 111.

An auxiliary storage unit 112 is a drive for driving a disk such as a magnetic or optical disk. In this embodiment, the auxiliary storage unit 112 is a drive for driving a large-capacity storage medium such as a hard disk. The auxiliary storage unit 112 is connected to the control unit 104, which serves as an internal IDE controller.

An audio codec 113 connected to the control unit 104 is a component for outputting an audio signal obtained as a result of a digital-analog conversion process to a component such as a speaker 114 or head phones 115. The audio signal represents a voice or a sound. In an apparatus configuration including a microphone, the audio codec 113 carries out a process to convert audio input data into a digital one.

A storage unit 116 is a memory for storing a control program for driving a computer. The storage unit 116 is connected to the control unit 104 and a control unit 117 by using an LPC (Low Pin Count) bus or the like.

The control unit 117 is a general-purpose unit for controlling a variety of signals. As the control unit 117, for example, an EC (Embedded Controller) is employed. The control unit 117 also controls the power supply of the information-processing apparatus 11 and additional functions of the information-processing apparatus 11. In the case of a portable information-processing apparatus, the control unit 117 is a microcomputer. It is to be noted that, by modifying a control program stored in the storage unit 116, the method for controlling the computer can be changed.

An operation section 118 including the operation element 17 provided on the main body of the information-processing apparatus 11 outputs a signal to the control unit 117. As a connection section 119 for connecting an external apparatus to the information-processing apparatus 11, a USB connector is provided on the main body of the information-processing apparatus 11. The USB connector 119 is also connected to the control unit 104.

It is to be noted that a power-supply section not shown in the figure receives a commercial power-supply voltage from an AC adaptor. As an alternative, the information-processing apparatus 11 may be powered by a battery pack serving as DC power supply. Typically, the battery pack includes secondary batteries or fuel batteries.

Figure 7:
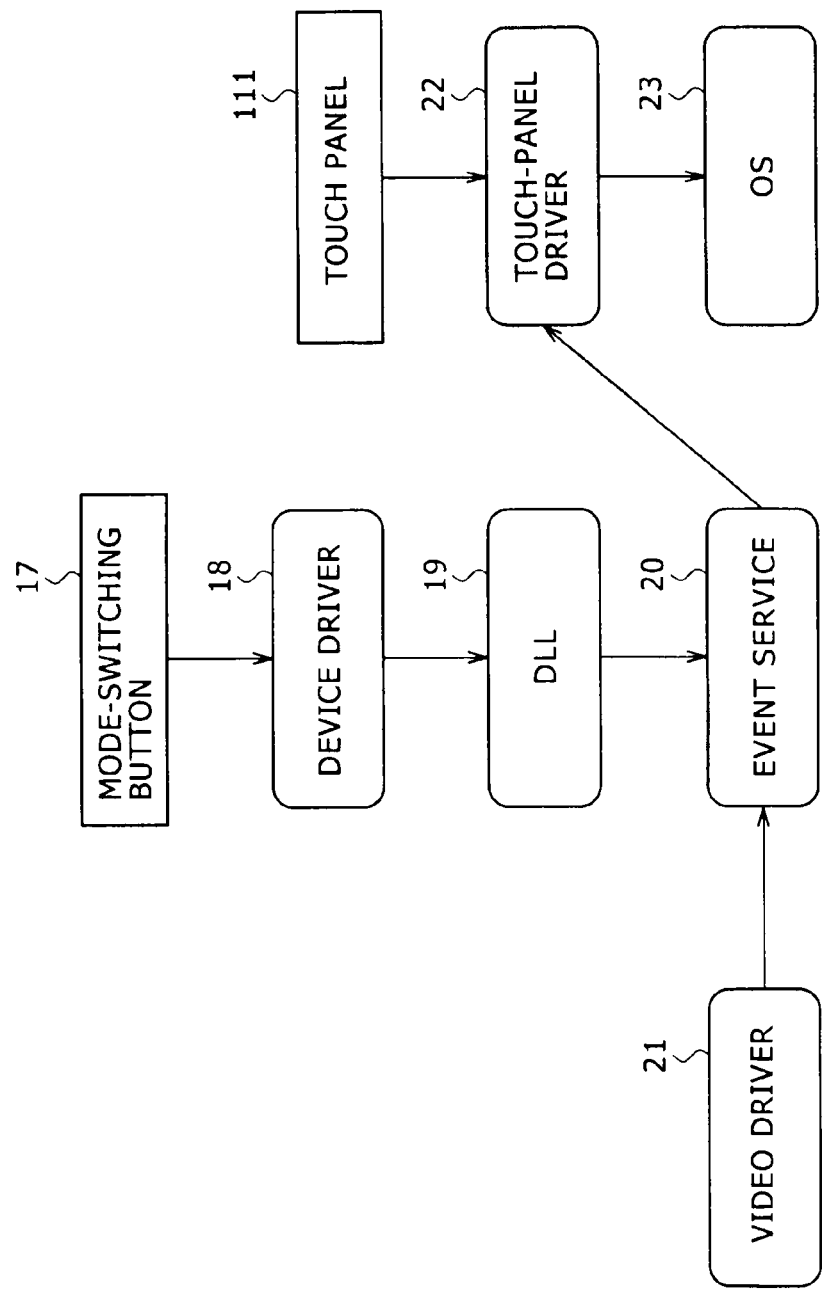
FIG. 7 is a diagram showing elements of a software configuration.

FIG. 7 is an explanatory diagram showing elements composing a software configuration.

Information on an operation (detected information on pressing or non-pressing button, for example) generated by the mode-switching button serving as one of the operation elements 17 is supplied to a device driver 18 by way of the control unit 117, which is an EC (Embedded Controller) in the embodiment. The device driver 18 then forwards the information on an operation to a dynamic link library 19. In turn, the dynamic link library 19 passes on the information on an operation to an event service 20.

The event service 20 is a program for monitoring the present setting state of the image resolution and changes in image resolution through a video driver 21. Receiving the information on an operation from the dynamic link library 19, the event service 20 determines a next mode to serve as the destination of a mode transition on the basis of the present image resolution and the present input operation mode. Then, the event service 20 issues a command based on a result of the determination to a touch-panel driver 22.

After the information on an operation carried out on the touch panel 111 has been output to the control unit 104, the information is sent to the OS 23 on an upper layer by way of the touch-panel driver 22. The touch-panel driver 22 sets an input operation mode according to the operation information received from the event service 20. As a result, when the user touches the touch panel 111, a message of a mouse event is sent to the OS 23 in accordance with the set mode. For example, an operation carried out by the user in the panning mode as described above is recognized as a request for a movement of a display range. In this case, a movement distance by which the display range is to be moved is computed from coordinates of a drag operation carried out by using a pointing device such as a stylus in the processing to move the display range. The computed movement distance is then supplied to the OS 23.

In this embodiment, the event service 20 executes a processing step of managing the setting of dynamic mode switching and determining a transition to an input operation mode identified in accordance with an operation carried out on the mode-switching button and the image resolution. Then, the touch-panel driver 22 informs the OS 23 of a mouse event in accordance with the set input operation mode. When the user carries out an operation to move the display operator 9 over the operation face of the touch panel after the event service 20 notifies the touch-panel driver 22 of a transition to the panning mode as explained earlier with reference to FIGS. 4A to 4D, for example, processing is carried out under control executed by the OS 23 to move the display range by the distance of a movement made in the movement of the display operator 9 in accordance with the already known method. It is to be noted that the scope of the present invention is not limited to this embodiment. For example, it is possible to provide a plurality of other embodiments in which the functions of the event service 20 and the touch-panel driver 22 are executed by a single program.

In accordance with the configuration described above, the following merits are offered.

The input operation mode for entering an input through the touch panel can be changed or switched to another mode instantly by operating a single operation button or carrying out an operation on a specific operation area on the touch panel. Thus, there is offered a merit of contribution to improvement of operatability. That is to say, it is not necessary to activate an application program for setting an input operation mode.

A display range in the panning mode can be moved by carrying out an operation on the touch panel. That is to say, an auxiliary operation section is not required. This merit is effective for simplification of the configuration and increasing the display area.

In addition, it should be understood by those skilled in the art that a variety of modifications, combinations, sub-combinations and alterations may occur in dependence on design requirements and other factors insofar as they are within the scope of the appended claims or the equivalents thereof.

What is claimed is:

1. An information processing apparatus comprising:
   circuitry configured to:
      receive input information based on a user operation of a surface of a display;
      determine a current display state each time an operation mode is changed by a user, the current display state chosen from among a panning state where an image is partially displayed on the display due to a resolution of the image being greater than a resolution of the display and a non-panning state where an image is entirely displayed on the display, the operation mode being selected from at least a first mode, a second mode, and a third mode;
      change the operation mode from the first mode to the second mode when a determination result indicates that the current display state is the panning state, wherein
         when the operation mode is changed to the second mode, said circuitry is further configured to detect a movement of the user operation based on received input information and to move an area frame where the displaying information is displayed based on detected movement, such that the area frame is moved from a first location on the display to a second location on the display, the second location being different from the first location; and
      change the operation mode from the first mode to the third mode when a determination result indicates that the current display state is the non-panning state; and
   an operation member that only provides instruction with respect to the operation mode when operated, wherein circuitry is configured to change the operation mode each time the operation member is operated by the user.

2. The information processing apparatus according to claim 1, wherein the circuitry is configured to change the operation mode based on the user operation on a predetermined area of said surface of said display.

3. The information processing apparatus according to claim 2, wherein the circuitry is configured to change the operation mode in a cyclic manner.

4. The information processing apparatus according to claim 2, wherein when a first element is displayed in the first mode and the operation mode is changed from the first mode to the second mode, the first element is changed to a second element.

5. The information processing apparatus according to claim 2, wherein
the operation member is arranged outside of said display.

6. The information processing apparatus according to claim 5, wherein said operation member is a mechanical button.

7. The information processing apparatus according to claim 2, wherein a cursor is displayed as a first image in the first mode and a palm icon as a second image in the second mode, the first image being different than the second image.

8. The information processing apparatus according to claim 1, wherein the first mode corresponds to a hover mode.

9. The information processing apparatus according to claim 1, wherein the second mode corresponds to a panning mode.

10. The information processing apparatus according to claim 1, wherein the third mode corresponds to a left-click mode.

11. An information processing apparatus comprising:
circuitry configured to:
receive input information based on a user operation of a surface of a display;
control said display;
change an operation mode to a mode selected from at least a first mode, a second mode, and a third mode;
change the operation mode from the first mode to the second mode based on a predetermined user operation when a maximum resolution of said display is lower than a resolution of information currently displayed in the first mode, wherein
when the operation mode is changed to the second mode, the circuitry is further configured to move an area frame where the information is displayed based on received input information, such that the area frame is moved from a first location on the display to a second location on the display, the second location being different from the first location; and
change the operation mode from the second mode to the third mode when the resolution of information to be displayed is changed, the maximum resolution of said display being higher than or equal to the changed resolution of information to be displayed; and
an operation member that only provides instruction with respect to the operation mode when operated, wherein circuitry is configured to change the operation mode each time the operation member is operated by the user.

12. An information processing method comprising:
receiving input information from a user operation of a surface of a display;
determining a current display state each time an operation mode is changed by a user, the current display state chosen from among a panning state where an image is partially displayed on the display due to a resolution of the image being greater than a resolution of the display and a non-panning state where an image is entirely displayed on the display, the operation mode being selected from at least a first mode, a second mode, and a third mode;

changing the operation mode from the first mode to the second mode when a determination result indicates that the current display state is the panning state, wherein
when the operation mode is changed to the second mode, detecting a movement of the user operation based on received input information and moving an area frame where the displaying information is displayed based on detected movement, such that the area frame is moved from a first location on the display to a second location on the display, the second location being different from the first location;
changing the operation mode from the first mode to the third mode when a determination result indicates that the current display state is the non-panning state; and
changing the operation mode each time an operation member is operated by the user, the operation member only providing instruction with respect to the operation mode when operated.

13. The information processing method according to claim 12, further comprising:
changing the operation mode based on the user operation on a predetermined area of said surface of said display.

14. The information processing method according to claim 13, further comprising:
changing the operation mode in a cyclic manner.

15. The information processing method according to claim 13, further comprising:
changing a first element to a second element when a first element is displayed in the first mode and the operation mode is changed from the first mode to the second mode.

16. The information processing method according to claim 13, wherein
the operation member is arranged outside of said display.

17. The information processing method according to claim 16, wherein said operation member is a mechanical button.

18. An information processing method comprising:
receiving input information based on a user operation to a surface of a display having a maximum resolution;
changing an operation mode to a mode including at least a first mode, a second mode, and a third mode;
changing the operation mode from the first mode to the second mode based on a predetermined user operation when the maximum resolution of said display is lower than a resolution of information currently displayed in the first mode, wherein
when the operation mode is changed to the second mode, moving an area frame where the information is displayed based on received input information, such that the area frame is moved from a first location on the display to a second location on the display, the second location being different from the first location;
changing the operation mode from the second mode to the third mode when the resolution of information to be displayed is changed, the maximum resolution of said display being higher than or equal to the changed resolution of information to be displayed; and
changing the operation mode each time an operation member is operated by the user, the operation member only providing instruction with respect to the operation mode when operated.

* * * * *